United States Patent [19]
Imasaki et al.

[11] Patent Number: 4,839,922
[45] Date of Patent: Jun. 13, 1989

[54] CATV SCRAMBLING AND DESCRAMBLING METHOD

[75] Inventors: Kenji Imasaki; Toshiaki Ichihashi; Masafumi Sasaki, all of Tokyo, Japan

[73] Assignee: Pioneer Electronic Corporation, Tokyo, Japan

[21] Appl. No.: 24,181

[22] Filed: Mar. 10, 1987

Related U.S. Application Data

[63] Continuation of Ser. No. 686,792, Dec. 26, 1984, abandoned.

[30] Foreign Application Priority Data

Dec. 26, 1983 [JP] Japan ............................... 58-248496

[51] Int. Cl.⁴ ............................................ H04N 7/167
[52] U.S. Cl. ........................................ 380/15; 380/19; 380/20
[58] Field of Search ............... 380/20, 15, 19; 358/86; 455/3

[56] References Cited

U.S. PATENT DOCUMENTS 4,064,536 12/1977 Saeki et al. .............................. 380/7
4,145,716 3/1979 Uemura et al. ......................... 380/7

*Primary Examiner*—Stephen C. Buczinski
*Assistant Examiner*—Bernarr E. Gregory
*Attorney, Agent, or Firm*—Sughrue, Mion, Zinn, Macpeak, and Seas

[57] ABSTRACT

A CATV scrambling and descrambling method in which the horizontal and vertical synchronizing signals of a composite television video signal are compressed in level, and a timing signal indicating the time positions of the horizontal and vertical synchronizing signal and which is superposed on a television audio signal is transmitted. On the transmitting side, the timing signal is superposed on an audio signal while moving the timing signal at random prior to transmission, an indication of the time position is indicated with a data signal, and this data signal is superposed on the audio signal at a different time position than the timing signal. On the receiving side, the data signal is decoded to detect the time position of the timing signal, and only the horizontal and vertical synchronizing signals of the video signal are level corrected to reproduce the video signal.

6 Claims, 6 Drawing Sheets

21
TV IF MOD.
22
SYNC SEP.
23
VARIABLE GAIN AMP.
24
VARIABLE GAIN AMP.
27
TV UP CONV.
N-SYNC
V-SYNC
25
SYNC COMPRS. PULSE GEN.
26
TIMING SIGNAL GEN.
OR GATE
35
DATA SIGNAL GEN.
33
RANDOM NUMBER GEN.
34

H.F. SIGNAL
TV CONV.
28
VARIABLE GAIN AMP.
31
OUTPUT
AUDIO DET.
29
PULSE GEN.
30
VARIABLE DELAY CKT.
38
DATA SEPARATING CKT.
36
DATA CONV.
37

H SYNC
V SYNC
DFF 1
DFF 2
OSC
COUNTER
LATCH
COM-PARATOR
MV
DELAY
S/R
2 TO 4 DECODE
COUNTER 2
"1"
26
33
34
35
101
102
103
104
105
106
107
108
109
110
111
112
114
115

30
38
37
225
222
224
223
221
205
204
COUNTER 3
203
COUNTER 2
202
COUNTER 1
DECODE
201
OSC
219
DFF 9
218
DFF 8
217
DFF 7
216
DFF 6
DFF 5
215
DFF 4
214
DFF 3
213
DFF 2
212
DFF 1
211
210
209
207
208
36

CATV SCRAMBLING AND DESCRAMBLING METHOD

This is a continuation of application Ser. No. 686,792 filed Dec. 26, 1984, now abandoned.

BACKGROUND OF THE INVENTION

The present invention relates to a CATV (cable television) scrambling and descrambling method.

Conventional systems of this type are intended to permit only designated signal receiving units to receive chargeable programs. An example of such a system is shown in FIGS. 1 and 2, of which FIG. 1 shows a scrambling unit and FIG. 2 shows a descrambling unit.

In the scrambling unit, a TVIF modulator 1 converts baseband video and audio signals into a video IF signal and an audio IF signal at intermediate frequencies, and a synchronizing separator circuit 2 separates a synchronizing signal from the video IF signal. The synchronizing signal thus separated is applied to a horizontal and vertical synchronizing compression pulse generating circuit 5 and a timing signal generating circuit 6. In the circuit 5, the output signal of the synchronizing separator circuit 2 is utilized to produce horizontal and vertical synchronizing interval pulses which in turn are used to compress the synchronizing component of the video IF signal, which is applied to a variable gain amplifier 3. The synchronizing signal is converted to a timing signal by the timing signal generating circuit 6. The timing signal is applied to a second variable gain amplifier 4 which receives the audio IF signal to thus superpose the timing signal on the audio IF signal. In the output signals of the variable gain amplifiers 3 and 4, as shown in FIGS. 3A and 3B, the superposed timing signal occurs earlier, by a time T, than the synchronizing part shown in FIG. 3A. The output signals of the amplifiers 3 and 4 are applied to a TV up-converter 7 where they are frequency shifted to a predetermined high frequency channel output.

In the descrambling unit, as shown in FIG. 2, a TV converter 8 receives a predetermined high frequency channel signal. The output of the TV converter 8 is applied to an audio signal detector 9 where the audio signal is separated and the timing signal is reproduced. The timing signal is applied to a return pulse generating circuit 10 to generate level-compressing horizontal and vertical synchronizing interval pulses in the high frequency video signal. As shown in FIG. 3C, the output signal of the circuit 10 lags the timing signal b by an interval of T. The output signal of the circuit 10 is applied to a variable gain amplifier 11 where it is superposed on the TV signal outputted by the TV converter to provide a descrambled signal d, which is transmitted to a television receiver.

In the conventional scrambling and descrambling system as described above, if the time difference T between the synchronizing part of the video signal and the timing signal superposed on the audio signal is known, then a descrambling circuit can be easily constructed. That is, in that case, chargeable programs can easily be received without using an authorized descrambling circuit.

SUMMARY OF THE INVENTION

Accordingly, an object of the invention is to eliminate the above-described difficulty accompanying a conventional CATV scrambling and descrambling method.

More specifically, an object of the invention is to provide a CATV scrambling and descrambling method in which chargeable programs cannot be received without using an authorized descrambling circuit.

The foregoing object and other objects of the invention have been achieved by the provision of a CATV scrambling and descrambling method in which the horizontal and vertical synchronizing signals of a television video signal are compressed in level, and a timing signal indicating the time positions of the horizontal and vertical synchronizing signals which are superposed on a television audio signal is transmitted. Further, according to the invention, on the television signal transmitting side, the timing signal is superposed on an audio signal by moving the timing signal in time at random before transmission. The time position of the timing signal being moved at random is indicated with a data signal, and the data signal is superposed on the audio signal in such a manner that, before transmission, on the audio signal, the data signal is shifted in position from the timing signal. On the television signal receiving side, the data signal is decoded to detect the time position of the timing signal, and only the horizontal and vertical synchronizing signals of the video signal are subjected to level correction to reproduce the video signal.

The nature, principle and utility of the invention will become more apparent from the following detailed description when read in conjunction with the accompanying drawings.

DESCRIPTION OF THE PREFERRED EMBODIMENTS

Figure 1:
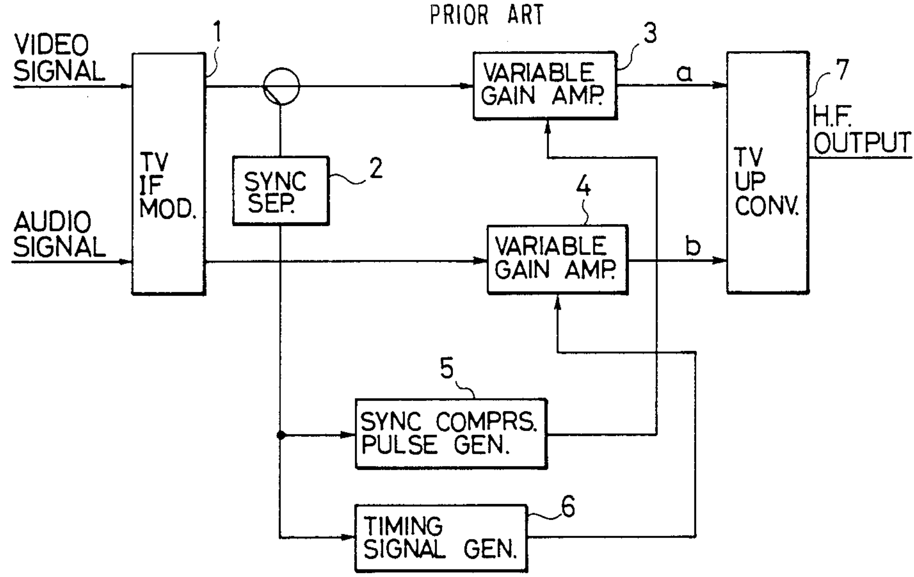
FIG. 1 is a block diagram showing a conventional scrambling circuit.
Figure 2:
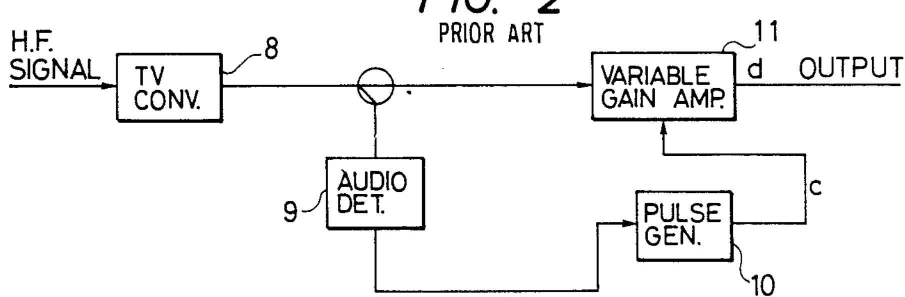
FIG. 2 is a block diagram showing a conventional descrambling circuit.
Figure 3A:
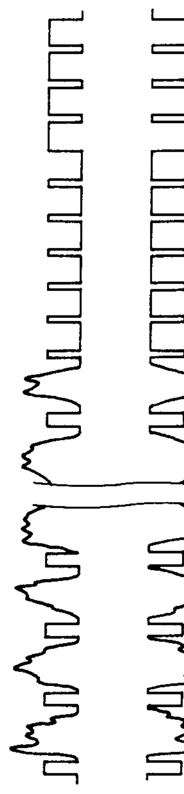
FIG. 3 is a timing chart used for a description of the operations of the conventional scrambling and descrambling circuits.
Figure 3B:
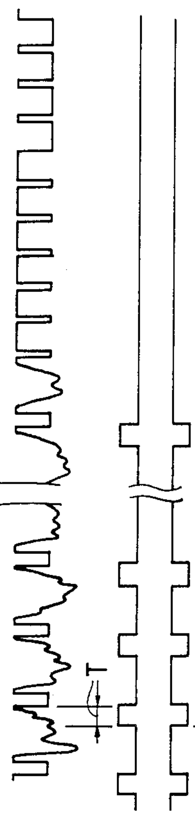
Figure 3C:
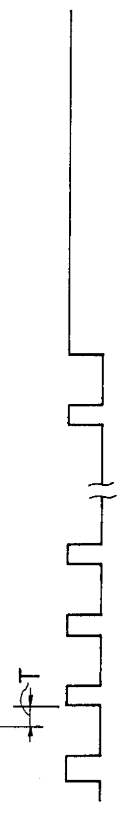
Figure 3D:
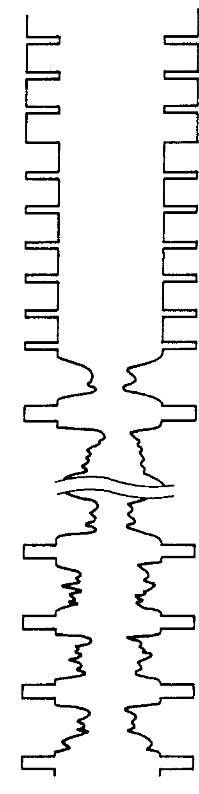

A CATV scrambling and descrambling method according to the invention will be described with reference to FIGS. 4 through 8.

In these figures, reference numeral 21 designates a TVIF modulator. The output video IF signal of the circuit 21 is applied to a synchronizing separator circuit 22 where the synchronizing signal is separated out. The separate synchronizing signal is applied to a horizontal and vertical synchronizing compression pulse generating circuit 25 and a timing signal generating circuit 26, similar to the conventional scrambling unit. The synchronizing signal is further applied to a random number generator 34.

The output of the random number generator 34 changes at random in the synchronizing signal's vertical interval. In response to the output value of the random number generator 34, the data signal generating circuit 33 outputs a data signal representing the time difference between the synchronizing signal's horizontal component and the timing signal. On the other hand, in response to the output value of the random number generator 34, the timing signal generating circuit 26 produces a timing signal which is shifted by $T_x$ in time from the synchronizing signal's horizontal component.

The output signals of the timing signal generating circuit 26 and the data signal generating circuit 33 are applied through an OR gate 35 to a variable gain amplifier 24 for the audio signal. The output signals are superposed on the audio IF signal in the variable gain amplifier 24. The audio IF signal thus converter 27.

Figure 6A:
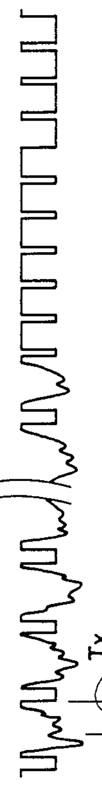
FIG. 6 is a timing chart for a description of the operation of the scrambling and descrambling circuits according to the invention.
Figure 6B:
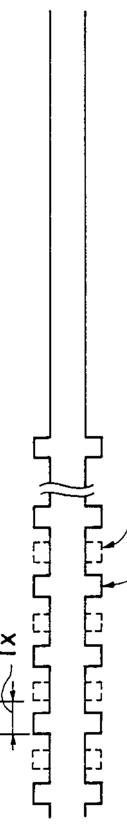

In the scrambling unit thus constructed, the TVIF video signal (a') whose synchronizing part is compressed as indicated in FIG. 6A is provided at the output of the variable gain amplifier 23 in response to the output pulse of the horizontal and vertical synchronizing compression pulse generating circuit 25. In response to the random number outputted by the random number generator 34 and applied to the timing signal generating circuit 26 and the data signal generating circuit 33, as shown in FIG. 6B, the timing signal generating circuit 26 outputs a timing signal (b') which is shifted in time by $T_x$ from the synchronizing part indicated in FIG. 6A, and the data signal generating circuit 33 outputs the data signal which has been converted into a predetermined code. The timing signal and the data signal are positioned differently in time by means of the OR gate 35.

Figure 5:
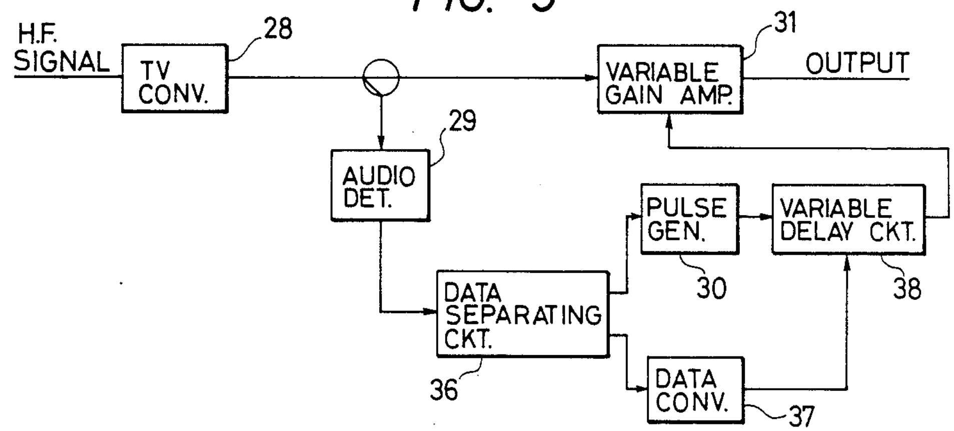
FIG. 5 is a block diagram showing a descrambling circuit according to the invention.
Figure 6C:
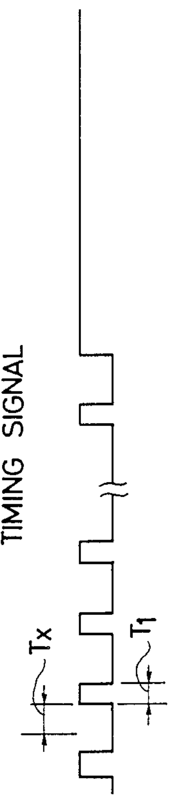
Figure 6D:
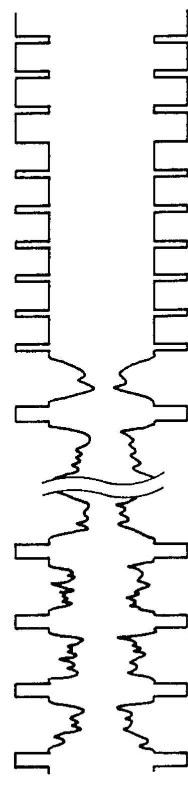

A descrambling unit of the invention is shown in FIG. 5. A TV signal inputted through a TV converter 28 is detected by an audio signal detector 29 to obtain a audio signal. The audio signal thus obtained is applied to a data separating circuit 36 to obtain the timing signal and the data signal. The timing signal is applied to a return pulse generating circuit 30 where it is converted into a return pulse having a predetermined time width $T_1$. The return pulse is delayed by $T_x$ by a variable delay circuit 38 so that it becomes a return pulse (c') as indicated in FIG. 6C. On the other hand, the output signal based on the random value which a data decoder 37 provides by decoding the data signal is applied to the variable delay circuit 38 to determine the delay time $T_x$. The gain of a variable gain amplifier 31 is set by the return pulse (c'), as a result of which an output signal (descrambled TV signal −d') as shown in FIG. 6D is applied to the television set.

In the above-described embodiment, variable gain amplifiers 23, 24 and 31 are employed. However, it goes without saying that the same effect can be obtained by replacing the variable gain amplifier with variable attenuator circuits.

Figure 4:
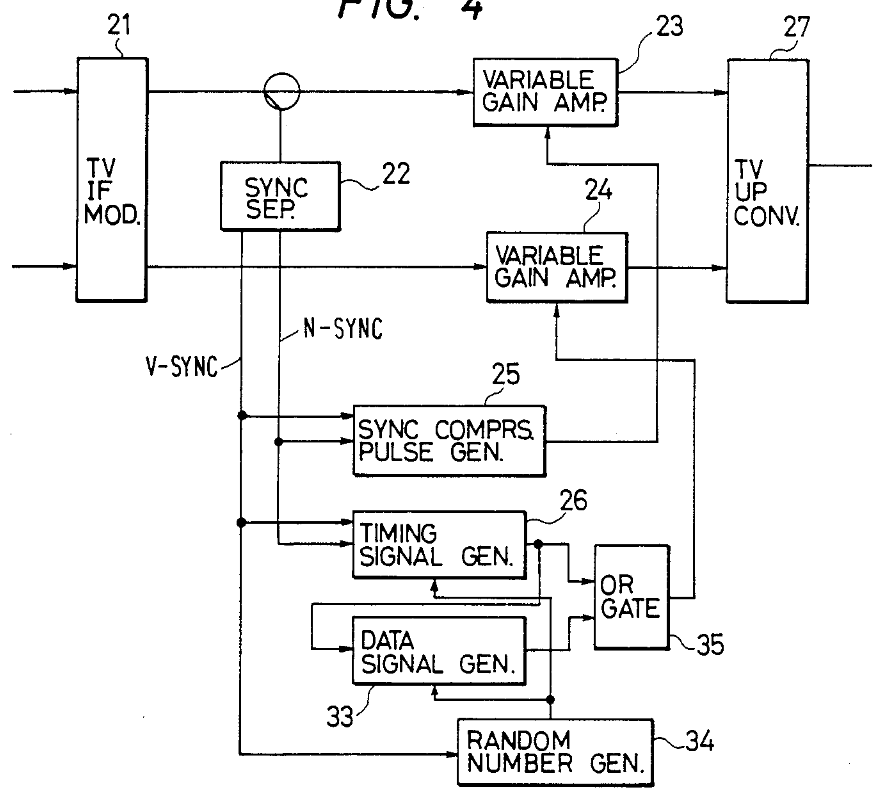
FIG. 4 is block diagram showing a scrambling circuit constructed according to the present invention.

In more detail, in FIG. 4, reference numeral 21 designates a TVIF modulator. A synchronizing separator circuit 22 separates horizontal (H SYNC) and vertical (V SYNC) synchronizing signals from the video IF signal generated by the TVIF modulator. The synchronizing signals thus separated are applied to a horizontal and vertical synchronizing compression pulse generating circuit 25, as in the case of the conventional system, and are also applied to a timing signal generating circuit 26, a data signal generating circuit 33 and a random number generator 34.

Figure 7:
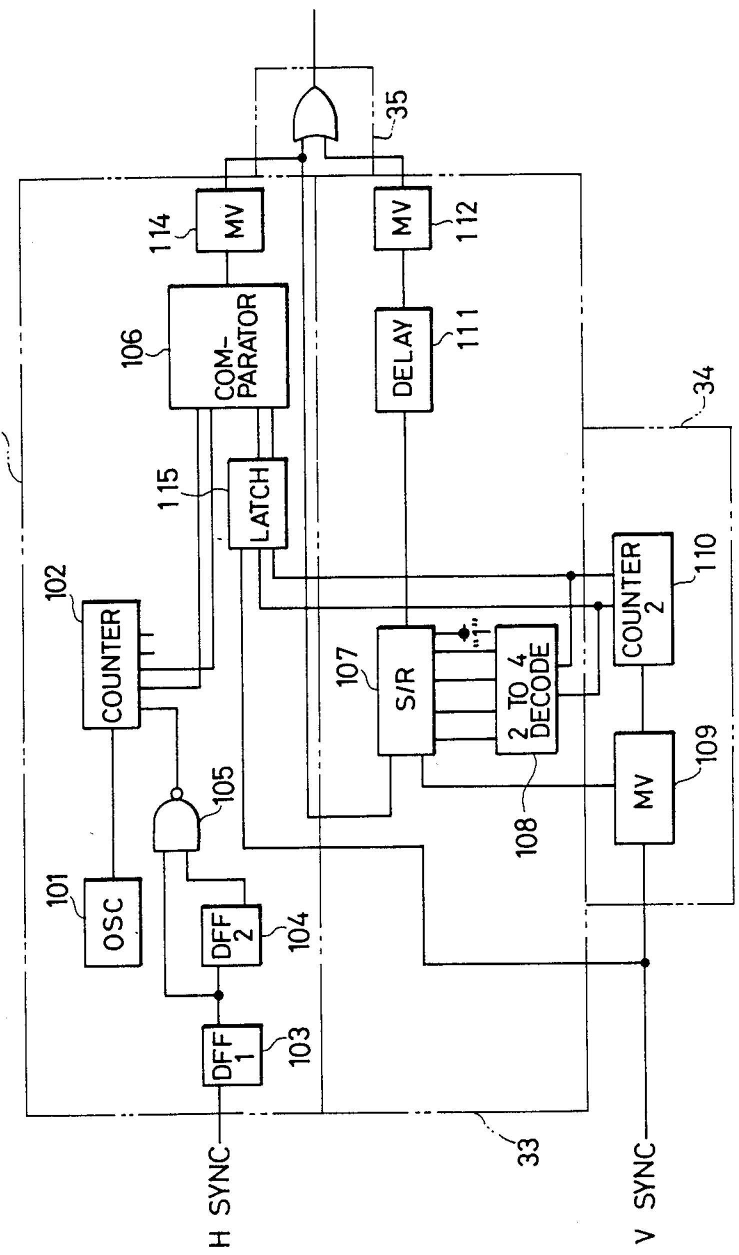
FIG. 7 is a block diagram showing details of the scrambling circuit of FIG. 4.

As shown in FIG. 7, the random number generator 34 is composed of a monostable multivibrator (MV) 109 and a counter (2) 114. The monostable multivibrator 109 is triggered and caused to generate an output signal at the rise of the V SYNC signal from the synchronizing separator circuit 22. The counter (2) is a two-bit counter which counts pulses during the presence of the output signal of the monostable multivibrator 109 and stops counting at random at either 00, 01, 10 or 11. The output of the counter (2) is applied to the timing signal generating circuit 26 and the data signal generating circuit 33.

In the timing signal generating circuit 26, as shown in FIG. 7, the H SYNC signal from the synchronizing separator circuit 22 is differentiated by a circuit composed of a D-type flip flops (DFF 1) 103, (DFF 2) 104 and a NAND gate (105) to obtain a rising pulse signal. The pulse signal resets a counter (1) 102 counting the output pulses of an oscillator circuit (OSC) 101. Moreover, the output value of the random number generator 34 is set in a latch 115 by the V SYNC signal from the synchronizing separator circuit 22. If the value of the output of the counter (1) 102 coincides with the numerical value stored in the latch 115, the comparator 106 will produce an output signal, the generation of which triggers the monostable multivibrator (MV) 114 to produce a pulse having a predetermined width. In the data signal generating circuit 33, the numerical value received from the random number generator 34 is converted by a two-bit/four-bit converter circuit (2 to 4 DECODE) 108 into the following four values:

| Input | Output |
|---|---|
| 00 | 1000 |
| 01 | 0100 |
| 10 | 0010 |
| 11 | 0001 |

A shift register (S/R) 107 is loaded with the output of the converter circuit 108 and the output of the monostable multivibrator (MV2) 109. The contents of the shift register (S/N) 107 are successively read out according to the output pulse from the timing signal generating circuit 26, delayed by a delay circuit (DELAY) 111 for a predetermined time and converted into a pulse having a predetermined width. An OR gate 35 composes the output signals from the timing signal generating circuit 26 and the data signal generating circuit 33 and supplies the synthesized product to a variable gain amplifier 24. The output signals from the timing signal generating circuit and the data signal generating circuit are superposed on an audio IF signal in the variable gain amplifier 24 and inputted to a TV up-converter 27 together with the video IF signal.

In the scrambling apparatus shown in FIG. 4, the TV video signal obtained by compressing the synchronizing part, as shown in FIG. 6A, is made available in the output of a variable gain amplifier 23 upon receipt of an output pulse of the horizontal and vertical synchronizing compression pulse generating circuit 25. Moreover, the four-bit random number received from the random number generator 34 is inputted on a field basis to the timing signal generating circuit 26 and the data signal generating circuit 33. The timing signal shifted by $T_x$ in time as shown in FIG. 6A is outputted from the timing signal generating circuit 26. The data indicating the time difference $T_x$ between the timing signal and the synchronizing part is converted into a predetermined code and outputted from the data signal generating circuit. These timing and data signals are arranged by action of the delay circuit 111 at different times and are combined by the OR gate 35.

Figure 8:
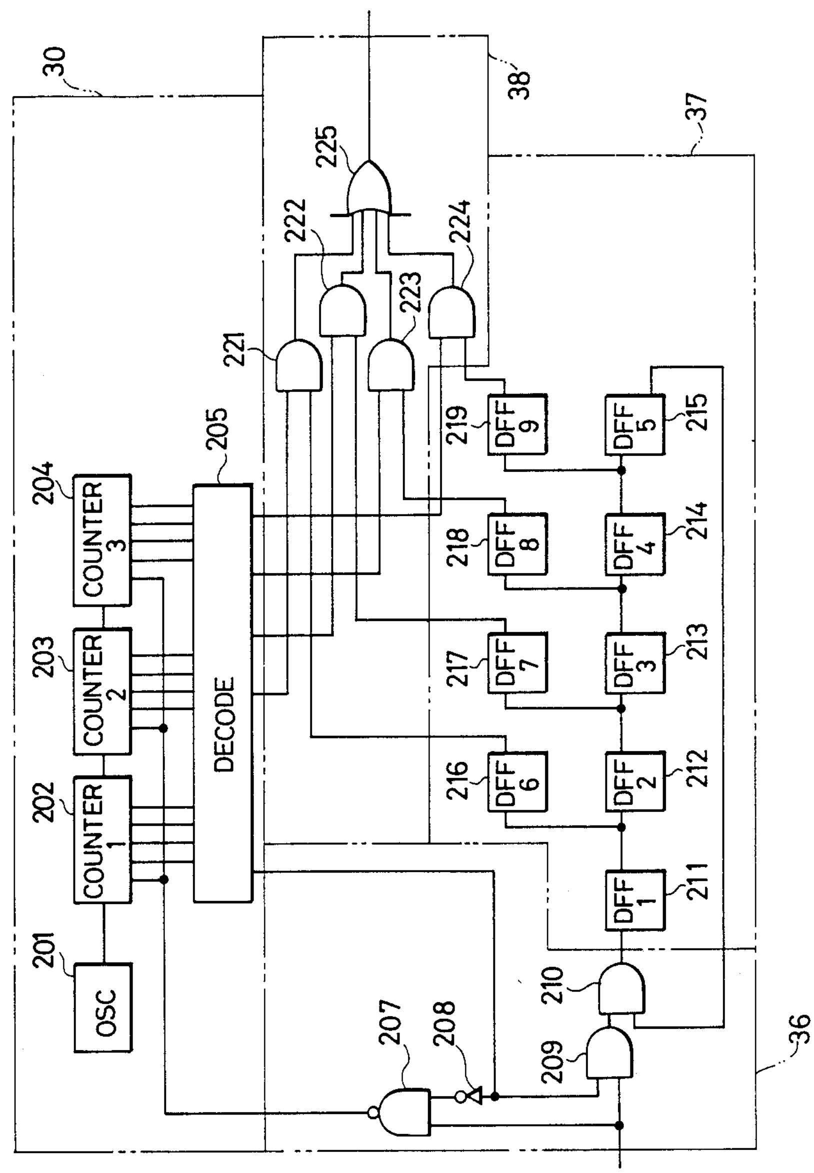
FIG. 8 is a block diagram showing details of the descrambling circuit of FIG. 5.

The descrambling apparatus is shown in detail in FIG. 8. With this apparatus, the timing and data signals detected from the TV signal inputted via the TV converter 28 by the audio signal detector 39 and superposed on the audio signal are obtained. These timing and data signals are inputted to the data separator circuit 36 before being divided into separate timing and data signals. In other words, the timing signal passes through the NAND gate 207 and resets the counters 1, 2, and 3 counting the pulses of the oscillator circuit (OSC) 201. These counters then start counting and, when they have counted up to a predetermined value, a decoder circuit (DECODE) 205 generates a data window pulse to thus enable an AND gate 209. Further, data window pulse is inputted to an inverter 208, the output of which disables the NAND gate 207, preventing the counters (1) 202, (2) 203 and (3) 204 from being reset by the data signal. It is thus possible to obtain the timing signal from only the output of the NAND gate 207 and the data signal from only the AND gate 209.

The timing signal is applied to a return pulse generator circuit 30. The counters (1) 202, (2) 203 and (3) 204 are reset by the timing signal. The outputs of these counters are inputted to the decoder circuit (DECODE) 205, whereby four return pulses having the predetermined time differences and time widths $T_1$ are obtained from the timing signal and inputted to AND gates (1) 221, (3) 223 and (4) 224. Furthermore, the data signal is inputted to the data decoder 37.

The five-bit data is passed through an AND gate 210 and successively read into D-type flip flops (DFF 1) 211, (DFF 2) 212, (DFF 3) 213, (DFF 4) 214 and (DFF 5) 215. If "1" as the head bit is read into the flip-flop (DFF 5) 215, the output of the flip-flop (DFF 5) 215 becomes "0", thus disabling the AND gate 210. The four-bit data read into the flip-flops (DFF 1) 211, (DFF 2) 212, (DFF 3) 213 and (DFF 4) 214 is transferred to flip-flops (DFF 6) 216, (DFF 7) 217, (DFF 8) 218 and (DFF 9) 219. The four-bit data held in the flip-flops (DFF 6) 216, (DFF 7) 217, (DFF 8) 218 and (DFF 9) 219 is outputted to a variable delay circuit 38. In the variable delay circuit 38, the four-bit data is applied to the AND gate 221, AND gate 222, AND gate 223 and AND gate 224. As previously referred to with respect to the scrambling circuit, since only one of the bits of the four-bit data is "1", a predetermined return pulse is caused to pass through an OR gate 225 and is obtained at the output of the OR gate 225 by enabling one of the AND gates 221, 222, 223 or 224.

The output signal, based on the random numerical value obtained by decoding the data signal using the data decoder, is applied to the variable delay circuit 38 and the predetermined return pulse delayed by $T_x$, as shown in FIG. 6C. The gain of the variable gain amplifier 31 is set by the return pulse signal (c') and the output signal (descrambled TV signal d') of FIG. 6D is supplied to the TV receiver.

As is apparent from the above description, in the method of the invention, the time difference between the compressed synchronizing part of the video signal and the timing signal superposed on the audio signal is changed at random, and therefore it is difficult to receive chargeable programs without using the authorized descrambling circuit. Furthermore, as in the case of the timing signal, the time difference data can be superposed as a data signal on the audio signal. Therefore, even if the scrambling and descrambling circuits employ inexpensive components of wide tolerances, a good scrambling effect is still obtained.

We claim:

1. A CATV scrambled and descrambling method in which the horizontal and vertical synchronizing signals of a television video signal are compressed in level, and a timing signal indicating the time positions of said horizontal and vertical synchronizing signals is superposed on a television audio signal and is transmitted, comprising:

on the television signal transmitting side:

generating a random number only in response to and during the interval of said vertical synchronizing signal;

generating said timing signal in response to the occurrence of both said horizontal and vertical synchronizing signals and moving said timing signal in time in response to the value of said random number;

superposing said timing signal on an audio signal while moving said timing signal in time, at random and in response to the vertical synchronization signal, prior to transmission, whereby the time difference between the compressed synchronization signals and said timing signal is varied at random;

providing an indication of the time position of said timing signal with a data signal generated in response to the value of said random number; and superposing said data signal on said audio signal by ORing said data signal and said timing signal and controlling the amplitude of the audio signal with said ORed signal, in such a manner that, on said audio signal, said data signal is different in position from said timing signal before transmission, and on the television signal receiving side:

decoding said data signal to detect the time position of said timing signal using the vertical sync signal as a decoding key; and level correcting only horizontal and vertical synchronizing signals of said video signal to reproduce said video signal.

2. The CATV scrambling and descrambling method of claim 1, wherein said step of superposing said data signal on said audio signal further comprises controlling the gain of a variable gain amplifier with the ORed signal, said audio signal being applied to an input of said variable gain amplifier.

3. The CATV scrambling and descrambling method of claim 1, wherein said step of superposing said data signal on said audio signal further comprises controlling the attenuation of a variable attenuator with the ORed signal, said audio signal being applied to an input of said variable attenuator.

4. The CATV scrambling and descrambling method of claim 1 wherein said step of providing an indication with a data signal comprises the identification of the random movement of the timing signal with a numerical value represented by a first number of bits and the conversion of said first number of bits to a second number of bits, reading said second number of bits successively according to said timing signal and delayed by a predetermined time and converting said successive bits into a pulse having a predetermined width for control of said superposing step.

5. The CATV scrambling and descrambling method of claim 1 wherein said decoding step further comprises the detection of timing from received data and timing signals prior to their separation and establishing a data window which enables separate detection of the timing signal and data signal.

6. The CATV scrambling and descrambling method of claim 1 wherein said random movement of said timing signal is identified by a random numerical value and wherein said decoding step comprises decoding said data signal to obtain an output signal based upon said random numerical value and applying said output signal to control a variable delay circuit.

* * * * *